US008501312B2

(12) United States Patent
Watanabe et al.

(10) Patent No.: US 8,501,312 B2
(45) Date of Patent: Aug. 6, 2013

(54) CHARGING MEMBER

(75) Inventors: Hiroaki Watanabe, Odawara (JP); Masaaki Harada, Yokohama (JP); Keiji Nose, Suntou-gun (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/372,454

(22) Filed: Feb. 13, 2012

(65) Prior Publication Data

US 2012/0141161 A1 Jun. 7, 2012

Related U.S. Application Data

(63) Continuation of application No. PCT/JP2011/005500, filed on Sep. 29, 2011.

(30) Foreign Application Priority Data

Oct. 15, 2010 (JP) ................................ 2010-232818

(51) Int. Cl.
*B32B 5/16* (2006.01)
*B32B 27/32* (2006.01)
*H01B 1/06* (2006.01)

(52) U.S. Cl.
USPC ............ 428/323; 428/521; 399/168; 252/511

(58) Field of Classification Search
None
See application file for complete search history.

(56) References Cited

U.S. PATENT DOCUMENTS

| | | | | |
|---|---|---|---|---|
| 6,243,552 | B1 | 6/2001 | Murata | |
| 6,589,647 | B1 * | 7/2003 | Ozawa et al. | 428/327 |
| 6,673,407 | B2 * | 1/2004 | Hara et al. | 428/36.9 |
| 7,366,448 | B2 * | 4/2008 | Taniguchi et al. | 399/176 |
| 7,486,911 | B2 | 2/2009 | Harada | |
| 2011/0176833 | A1 | 7/2011 | Harada et al. | |
| 2012/0045250 | A1 | 2/2012 | Harada et al. | |
| 2012/0076539 | A1 | 3/2012 | Sato et al. | |
| 2012/0082852 | A1 | 4/2012 | Nose et al. | |
| 2012/0177408 | A1 | 7/2012 | Watanabe et al. | |

FOREIGN PATENT DOCUMENTS

| | | | |
|---|---|---|---|
| JP | 62-127329 | A | 6/1987 |
| JP | 8-292625 | A | 11/1996 |
| JP | 9-90714 | A | 4/1997 |
| JP | 9-127760 | A | 5/1997 |
| JP | 2000-63656 | A | 2/2000 |
| JP | 2000-105495 | A | 4/2000 |
| JP | 2007-292298 | A | 11/2007 |
| JP | 2009-14834 | A | 1/2009 |
| JP | 2011-138004 | A | 7/2011 |

OTHER PUBLICATIONS

Harada, et al., U.S. Appl. No. 13/471,338, filed May 14, 2012.
English translation of International Preliminary Report on Patentability, International Application No. PCT/JP2011/005500, Mailing Date May 16, 2013.

* cited by examiner

*Primary Examiner* — Sheeba Ahmed
(74) *Attorney, Agent, or Firm* — Fitzpatrick, Cella, Harper & Scinto

(57) ABSTRACT

To provide a charging member that can not easily change in electrical resistance even by any long-term continuous application of direct-current voltage and, as a result thereof, may cause less change in its charging performance with time. The charging member has an electrically conductive support and an electrically conductive elastic layer. The elastic layer contains a vulcanized rubber. The vulcanized rubber is a vulcanized product of a mixture which contains i) a binder polymer containing a polymer having a butadiene skeleton and ii) carbon black, where the polymer having a butadiene skeleton stands modified at the molecular terminal(s) thereof with a group represented by the following formulas (1) or (2).

(1)

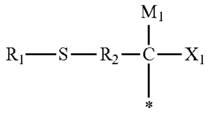

(2)

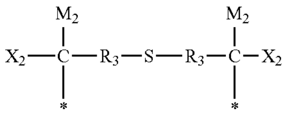

5 Claims, 2 Drawing Sheets

CHARGING MEMBER

CROSS-REFERENCE TO RELATED APPLICATIONS

This application is a continuation of International Application No. PCT/JP2011/005500, filed Sep. 29, 2011, which claims the benefit of Japanese Patent Application No. 2010-232818, filed Oct. 15, 2010.

BACKGROUND OF THE INVENTION

1. Field of the Invention

This invention relates to a charging member, an electrophotographic apparatus and a process cartridge.

2. Description of the Related Art

An elastic layer of a charging roller used in a contact charging system usually has an electrical conductivity of approximately from $1\times10^3$ to $1\times10^7$ $\Omega\cdot$cm in volume resistivity. In order to obtain an elastic layer having such an electrical conductivity, an electronic conduction type conductive rubber composition compounded with conductive particles such as carbon black may be used to form the elastic layer. This is disclosed in Japanese Patent Application Laid-open No. H09-090714 and Japanese Patent Application Laid-open No. 2000-063656.

However, the elastic layer thus formed has, as disclosed in Japanese Patent Application Laid-open No. H09-090714 and Japanese Patent Application Laid-open No. 2000-063656, a problem that its electrical resistance depends so strongly on the state of dispersion of the conductive particles as to tend to cause resistance non-uniformity in the charging roller. In addition, in the charging member having such an elastic layer, the conductive particles in the elastic layer may faster come to aggregate because of continuous application of direct-current voltage, so that the elastic layer may gradually change in its electrical resistance.

Japanese Patent Application Laid-open No. 2007-292298 discloses that a bead mill may be used when the conductive particles such as carbon black are dispersed in a material for forming a conductive coat layer of the charging member and this enables achievement of the resolution of the problem that the charging member layer may change in electrical resistance with its service.

SUMMARY OF THE INVENTION

The present inventors have confirmed that the invention according to Japanese Patent Application Laid-open No. 2007-292298 is effective in resolving the problem that the charging member having the elastic layer formed by using the electronic conduction type conductive rubber composition may change with time in its electrical resistance. However, under circumstances where electrophotographic apparatus are sought to be much more improved in running performance (durability), the present inventors have realized that the charging member must be much more kept from varying in electrical resistance when direct-current voltage is continuously kept applied to the charging member.

Accordingly, the present inventors have made studies so that the above problem can be resolved in an aspect of materials. As the result, they have found that a polymer having a butadiene skeleton having been modified with a specific terminal group may be used as a binder polymer serving as a raw-material for the elastic layer and this is very effective in resolving the above problem.

The present invention is directed to providing a charging member that can not easily change in electrical resistance even by any long-term continuous application of direct-current voltage and, as a result thereof, may cause less change in its charging performance with time. Further, the present invention is directed to providing an electrophotographic apparatus, and a process cartridge, that can form high-grade electrophotographic images stably.

According to one aspect of the present invention, there is provided a charging member comprising: an electrically conductive support; and an electrically conductive elastic layer; wherein: the elastic layer comprises a vulcanized rubber, and the vulcanized rubber is a vulcanized product of a mixture which comprises i) a binder polymer containing a polymer having a butadiene skeleton and ii) carbon black, and wherein the polymer having a butadiene skeleton stands modified at the molecular terminal(s) thereof with any one group selected from the group consisting of groups represented by the following formulas (1) and (2).

(1)

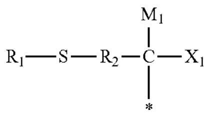

In the formula (1), $R_1$ represents an alkyl group having 1 to 18 carbon atom(s) or a phenyl group which may be substituted with an alkyl group having 1 to 3 carbon atom(s); $R_2$ represents an alkylene group having 1 to 6 carbon atom(s); $M_1$ represents a hydroxyl group; $X_1$ represents an alkyl group having 1 to 18 carbon atom(s), a phenyl group which may be substituted with an alkyl group having 1 to 3 carbon atom(s), or an alkoxyl group having 1 to 18 carbon atom(s); and an asterisk * represents the position of bonding with a carbon atom at the terminal end of the polymer having a butadiene skeleton.

(2)

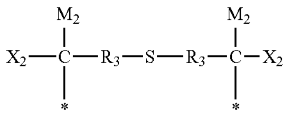

In the formula (2), $R_3$'s each represent an alkylene group having 1 to 6 carbon atom(s); $M_2$'s each represent a hydroxyl group; $X_2$'s each represent an alkyl group having 1 to 18 carbon atom(s), a phenyl group which may be substituted with an alkyl group having 1 to 3 carbon atom(s), or an alkoxyl group having 1 to 18 carbon atom(s); and asterisks *'s represent the position of bonding with a carbon atom at the terminal end of the polymer having a butadiene skeleton.

According to another aspect of the present invention, there is provided an electrophotographic apparatus comprising: the above charging member and an electrophotographic photosensitive member which is so disposed as to be electrostatically chargeable by the charging member.

According to further aspect of the present invention, there is provided a process cartridge comprising the above charging member, and the process cartridge is so conformed as to be detachably mountable to the main body of an electrophotographic apparatus.

According to the present invention, a charging member can be obtained that can not easily change in electrical resistance against any long-term service and contributes to stable formation of high-grade electrophotographic images. According to the present invention, an electrophotographic apparatus and a process cartridge can also be obtained that can form high-grade electrophotographic images stably.

Further features of the present invention will become apparent from the following description of exemplary embodiments with reference to the attached drawings.

DESCRIPTION OF THE EMBODIMENTS

Figure 1:
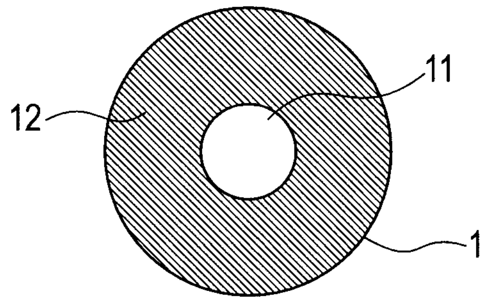
FIG. 1 is a sectional view showing an example of the charging member of the present invention.

Preferred embodiments of the present invention will now be described in detail in accordance with the accompanying drawings.

Charging Member

A roller-shaped charging member (hereinafter termed “charging roller”) according to the present invention is described below with reference to FIG. 1. That is, a charging roller 1 according to the present invention has a mandrel 11 as a support and provided on its peripheral surface an electrically conductive elastic layer 12.

Support:

As the support, there are no particular limitations thereon as long as it is strong enough to be able to support the elastic layer formed thereon and is electrically conductive enough to serve as an electrode when voltage is applied to the elastic layer. As a material for the support, a metal or an alloy of metals may be used, such as iron, copper, stainless steel, aluminum or nickel.

Elastic Layer:

The elastic layer is what provides the charging member with the elasticity that enables formation of a nip zone between it and a photosensitive member and with the electrical conductivity, and it contains a vulcanized rubber. Then, the vulcanized rubber is a vulcanized product of a mixture which contains i) a binder polymer containing a polymer having a butadiene skeleton and ii) carbon black as conductive particles having been dispersed in the binder polymer.

Then, the polymer having a butadiene skeleton is a polymer to the terminal(s) of the butadiene skeleton of which one of groups selected from the group consisting of groups represented by the following formulas (1) and (2) is attached.

(1)

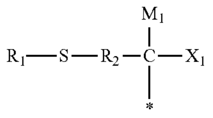

In the formula (1), $R_1$ represents an alkyl group having 1 to 18 carbon atom(s) or a phenyl group which may be substituted with an alkyl group having 1 to 3 carbon atom(s). $X_1$ represents an alkyl group having 1 to 18 carbon atom(s), a phenyl group which may be substituted with an alkyl group having 1 to 3 carbon atom(s), or an alkoxyl group having 1 to 18 carbon atom(s). Here, the compound in which $X_1$ is an alkoxyl group having 1 to 18 carbon atom(s) means a compound in which the alkoxyl group having 1 to 18 carbon atom(s) is bonded to the carbon atom in the formula (1) through an oxygen atom.

$R_2$ represents an alkylene group having 1 to 6 carbon atom(s). Also, $M_1$ represents a hydroxyl group. An asterisk * represents the position of bonding with the carbon atom(s) at the butadiene terminal of the polymer having a butadiene skeleton.

(2)

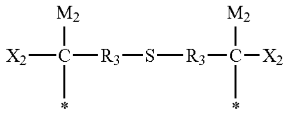

In the formula (2), $R_3$'s each represent an alkylene group having 1 to 6 carbon atom(s). $X_2$'s each represent an alkyl group having 1 to 18 carbon atom(s), a phenyl group which may be substituted with an alkyl group having 1 to 3 carbon atom(s), or an alkoxyl group having 1 to 18 carbon atom(s). Here, the compound in which $X_2$'s are each an alkoxyl group having 1 to 18 carbon atom(s) means a compound in which each alkoxyl group having 1 to 18 carbon atom(s) is bonded to each carbon atom in the formula (2) through an oxygen atom.

$M_2$'s each represent a hydroxyl group. The two $M_2$'s and the two $R_3$'s may each separately be the same or be different. Also, asterisks *'s represent the position of bonding with carbon atoms at the butadiene terminals of the polymer having a butadiene skeleton the rubber according to the present invention.

The polymer according to the present invention, having as a terminal group the group represented by the formula (1) or (2), a cation(s) is/are considered to come at the terminal group represented by the formula (1) or (2), on account of heat or the like produced when it is kneaded with the carbon black. Then, it is considered that, in virtue of the action of such a cation(s), a chemical linkage(s) is/are formed between this terminal group and any functional groups such as quinone, hydroxyl, ester, carboxyl and ether present on carbon black particle surfaces, thus the carbon black is fastened to the polymer, and hence this makes stable the state of dispersion of the carbon black in the elastic layer.

It is further considered that the sulfur atom in the terminal group contributes to the cross-linking of the polymer to make stable a cross-linked structure of the polymer in the elastic layer and make more stable the state of its presence together with the carbon black in the elastic layer.

As the result, the state of dispersion of the carbon black in the elastic layer of the charging member can not easily change with any changes of an environment where the charging member is placed or even with application of direct-current voltage to the charging member over a long period of time, so that the charging member can be kept from undergoing any environmental variations in electrical resistance or from increasing in the value of electrical resistance with time, as so considered.

It is also considered that these effects can be higher in a semiconducting region of about $1\times10^3$ to $1\times10^7$ Ω·cm in volume resistivity.

The polymer having a butadiene skeleton may include as examples thereof any single polymer (homopolymer) of a conjugated diolefin and any inter-polymer (copolymer) of a conjugated diolefin and an aromatic vinyl compound. Such a polymer can be vulcanized (sulfur-curable) as having the butadiene skeleton in the backbone chain, and can readily provide the elastic layer with rubber elasticity.

Specific examples of the conjugated diolefin are given below: 1,3-Butadiene, isoprene, 1,3-pentadiene, 2,3-dimethyl-1,3-butadiene and 1,3-hexadiene.

Specific examples of the aromatic vinyl compound are given below: Styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, vinylbenzyldimethylamine, (4-vinylbenzyl)dimethylaminoethyl ether, N,N-dimethylaminoethylstyrene, vinylpyridine, p-methylstyrene, vinyltoluene, and vinylnaphthalene. Of these monomers, styrene is preferable because it is readily industrially available, and moreover promises a good moldability of the copolymer to be obtained.

The polymer having a butadiene skeleton that is preferably usable in the present invention may include polybutadiene and a styrene-butadiene copolymer.

The polymer having a butadiene skeleton having at the molecular terminal(s) thereof the group represented by the formula (1) or (2), may be produced by the following method.

First, a monomer material containing the butadiene is polymerized in the presence of a polymerization initiator to obtain the polymer. Such polymerization may be carried out by any method, and may preferably be carried out in a hydrocarbon solvent. The hydrocarbon solvent may include, e.g., pentane, hexane, heptane, octane, methylcyclopentane, cyclohexane, benzene, toluene and xylene. In particular, cyclohexane and heptane are preferred. As the polymerization initiator, an alkali metal, an alkaline earth metal or an organolithium compound such as a lithium amide compound may be used.

Thereafter, a terminal-modifying agent described later is allowed to react at the living polymerization terminal(s) of the polymer obtained. For example, where the organolithium compound is used as a catalyst, living lithium is present at the molecular terminal(s) of the polymer. This living lithium is allowed to react with the terminal-modifying agent, whereby the polymer can be obtained at the molecular terminal(s) of which the group represented by the formula (1) or (2) has been introduced.

Incidentally, such a terminal-modified polymer of which the group represented by the formula (1) or (2) has been introduced to a terminal end of a polymer having a butadiene skeleton itself thus produced, is disclosed in Japanese Patent Application Laid-open No. S62-127329 as its use for tread rubber of a tire.

As methods for the reaction of the polymer with the terminal-modifying agent, the following methods (a) and (b) are available.

(a) A method in which the monomer material containing the conjugated diolefin is polymerized in the presence of an alkali metal and/or alkaline earth metal catalyst, and thereafter the terminal-modifying agent is added to the polymerization solution to allow them to react.

(b) A method in which the monomer material containing the conjugated diolefin is polymerized to obtain the polymer, and thereafter the polymer is dissolved in a solvent, where an alkali metal and/or alkaline earth metal is added to the polymer standing dissolved, and then the terminal-modifying agent is added thereto to allow them to react.

The method (b) is preferable because the polymerization of the monomer material containing the conjugated diolefin and the introduction of the terminal-modifying agent can continuously be effected.

As the terminal-modifying agent usable in order to introduce the terminal group represented by the formula (1), it may include, e.g., one having a structure represented by the following formula (4).

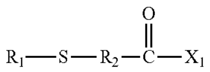

(3)

In the formula (3), the definitions of $R_1$, $R_2$ and $X_1$ are the same as the definitions of $R_1$, $R_2$ and $X_1$ in the formula (1).

Here, in the terminal-modifying agent represented by the formula (3), an agent in which $R_1$ and $X_1$ are each an alkyl group having 1 to 18 carbon atom(s) or a phenyl group which may be substituted with an alkyl group having 1 to 3 carbon atom(s) and also $R_2$ is an alkylene group having 1 to 6 carbon atom(s) has a low viscosity, and hence is preferable in view of readiness to introduce into the polymer the terminal group represented by the formula (1).

Specific examples of the terminal-modifying agent represented by the formula (3) are given below: Methyl thioacetone, 2-octyl thioethyl benzyl ketone, 2-phenyl thioethyl phenyl ketone, p-lauryl thiobenzophenone, p-lauryl thioacetophenone, methyl(methylthio)acetate; methyl(methylthio) propionate, stearyl (methylthio)propionate, methyl (stearylthio)propionate, phenyl(stearylthio)propionate, benzyl(stearylthio)propionate, phenyl(octylthio)propionate, benzyl(laurylthio)propionate, hexyl(propylthio)propionate, phenyl(methylthio)propionate, benzyl(methylthio)propionate, hexyl(propylthio)propionate, lauryl(ethylthio)propionate, myristyl(octylthio)propionate, stearyl(laurylthio)propionate, stearyl(stearylthio) propionate, stearyl(benzylthio) propionate, stearyl(p-tolylthio)propionate; methyl(p-laurylthio)benzoate, methyl(o-laurylthio)benzoate, phenyl (o-laurylthio)benzoate; and ethyl(2-methylthio)butyrate.

As the terminal-modifying agent usable in order to introduce the terminal group represented by the formula (2), it may include, e.g., one having a structure represented by the following formula (3).

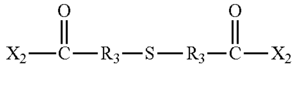

(4)

In the formula (4), the definitions of $X_2$'s and $R_3$'s are the same as the definitions of those in the formula (2).

In the terminal-modifying agent represented by the formula (4), an agent in which $R_3$'s are each an alkylene group having 1 to 6 carbon atom(s) and also $X_2$'s are each an alkyl group having 1 to 18 carbon atom(s), an alkoxyl group having 1 to 18 carbon atom(s) or a phenyl group which may be substituted with an alkyl group having 1 to 3 carbon atom(s) has a low viscosity, and hence is preferable in view of readiness to introduce into the polymer the terminal group represented by the formula (2).

Specific examples of the terminal-modifying agent represented by the formula (4) are listed below: Dimethyl 3,3'- thiodipropionate, dilauryl 3,3'-thiodipropionate, dimyristyl 3,3'-thiodipropionate, distearyl 3,3'-thiodipropionate, dimethyl 7,7'-thiodiheptanoate, and distearyl 7,7'-thiodiheptanoate.

These terminal-modifying agents may be produced by various methods, as exemplified by a method in which the hydroxyl groups at the terminals of a thiodicarboxylic acid are esterified with a monocarboxylic acid. As a catalyst used in the reaction by which any of these terminal-modifying agents is introduced into the molecular terminal(s) of the polymer, an alkali metal or an alkaline earth metal may be used, which may include, e.g., alkyllithiums such as n-butyllithium, sec-butyllithium and t-butyllithium.

Carbon Black:

There are no particular limitations on the carbon black to be contained in the elastic layer together with the polymer according to the present invention. It may preferably be one having a functional group capable of reacting with the cation(s) that is/are considered to come at the terminal group represented by the formula (1) or (2). Stated specifically, conductive carbons such as KETJEN BLACK and acetylene black and rubber-purpose carbons such as SAF, ISAF, HAF, FEF, GPF, SRF, FT and MT may be used. It is known that functional groups such as quinone, hydroxyl, ester, carboxyl and ether are present on carbon black particle surfaces. Then, these functional groups and the polymer terminal group combine chemically by the action of the cation(s) coming at the terminal group represented by the formula (1) or (2), whereby the carbon black is fastened to the terminal group(s) of the polymer.

The carbon black may preferably have a pH in the range of from 3 to 9, and a volatile component of from 0.3% by mass to 5.0% by mass. The pH of the carbon black may be measured by a method that accords with DIN ISO 787/9, and the volatile component of the carbon black may be measured by a method that accords with DIN 53552.

The lower pH the carbon black has and the more volatile component it has, the more surface functional groups it contains. As long as the carbon black has the pH and volatile component within the above ranges, it can have the surface functional groups in an appropriate number, and can keep itself from combining with rubber so excessively as to consequently make the elastic layer have a large electrical resistance, or from combining with rubber so weakly as to insufficiently bring the effect of keeping electrification deterioration from occurring.

The carbon black may preferably be contained in the elastic layer in an amount of from 30 parts by mass to 70 parts by mass based on 100 parts by mass of rubber to be obtained by polymerizing the monomer material containing the butadiene. As long as the carbon black is in a content within this range, it can provide the elastic layer with appropriate electrical conductivity and flexibility to form a nip between the charging member and the photosensitive member and enable the latter to be properly charged, and can keep toners and any dirt such as paper dust from sticking to their surfaces even as a result of long-term service, so that good imaged can be formed.

The elastic layer may be incorporated with other polymer(s) and any compounding agent(s) as long as the rubber and the carbon black are not inhibited from functioning as such.

Such other polymer(s) may include the following: Natural rubber (NR), isoprene rubber (IR), butadiene rubber (BR), styrene-butadiene rubber (SBR), butyl rubber (IIR), an ethylene-propylene-diene terpolymer rubber (EPDM), an epichlorohydrin homopolymer (CHC), an epichlorohydrin-ethylene oxide copolymer (CHR), an epichlorohydrin-ethylene oxide-allyl glycidyl ether terpolymer (CHR-AGE), an acrylonitrile-butadiene copolymer (NBR), a hydrogenation product of an acrylonitrile-butadiene copolymer (H-NBR), chloroprene rubber (CR), and acrylic rubbers (ACM, ANM).

As the compounding agent(s), a filler, a processing aid, a cross-linking auxiliary agent, a cross-linking accelerator, a cross-linking accelerator activator, a cross-linking retarder, a softening agent, a plasticizer, a dispersant and so forth may optionally be added which are commonly used as compounding agents for rubbers.

As methods for mixing these raw materials prepare a rubber mixture, they may be exemplified by a mixing method making use of a closed mixing machine such as Banbury mixer or a pressure kneader and a mixing method making use of an open mixing machine such as an open roll.

The elastic layer may be formed, as a method therefor, by mixing the above raw-materials and kneading the mixture obtained to prepare the rubber mixture. In the rubber mixture, the terminal functional group(s) of the rubber come(s) to combine with the carbon black and a state of uniform and stable dispersion of the carbon black is formed in the rubber. A method may be used in which the rubber mixture obtained is extruded in the shape of a tube by means of an extruder, this extruded product is vulcanized by means of a vulcanizing pan to obtain a tube, then the electrically conductive support is press-fitted thereinto, and thereafter the surface of the tube is sanded to give the desired outer diameter.

A method may also be used in which the rubber mixture is co-extruded into a cylindrical shape setting the electrically conductive support at the center, by means of an extruder fitted with a cross-head, and the extruded product is vulcanized using a mold having the desired outer diameter to obtain the elastic layer.

In order to keep toners and any dirt such as paper dust from sticking to the surface of the charging member, the surface of the elastic layer may be surface-treated by irradiation with ultraviolet rays, electron rays or the like. A surface layer may also be formed thereon by coating or the like. As a method for forming the surface layer, a method is available in which a liquid prepared by dissolving or dispersing a surface layer material such as a resin in a solvent is coated on the surface of the elastic layer by a coating method such as dipping, ring coating, beam coating, roll coating or spraying.

As the surface layer material, a material may be used which is prepared by, e.g., dispersing a conducting agent or the like in a binder polymer such as an acrylic polymer, polyurethane, polyamide, polyester, polyolefin or silicone to afford the desired electrical resistance value. The conducting agent may specifically include the following: Carbon black, graphite and oxides such as titanium oxide and tin oxide; metals such as Cu and Ag, or conductive particles having been made electrically conductive by coating particle surfaces with an oxide or metal; and ionic electrolytes such as $LiClO_4$, KSCN, NaSCN and $LiCF_3SO_3$.

As the surface layer, a sol-gel film may also be formed which is composed of a polysiloxane having an oxyalkylene group.

The charging member may be one having further optionally provided with a functional layer such as an adhesion layer, a diffusion preventive layer, a subbing layer or a primer layer.

As the charging member according to the present invention, a charging roller as an example thereof is shown in FIG. 1. The charging roller shown in FIG. 1 has a conductive support 11 and a conductive elastic layer 12 formed on the conductive support 11. This roller may also be applied to, besides the charging member, a developing member, a transfer member, a destaticizing member, a paper feed member and so forth.

Electrophotographic Apparatus

Figure 2:
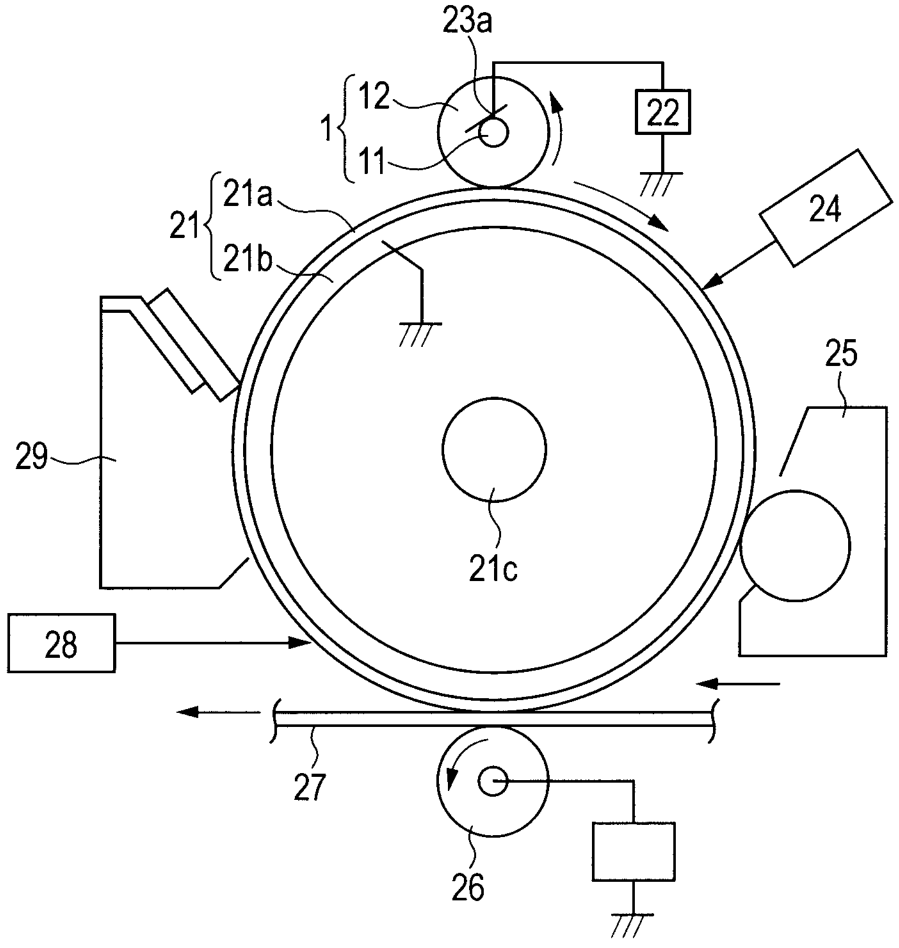
FIG. 2 is a structural view showing an example of an electrophotographic apparatus making use of the charging member of the present invention.

An example of an electrophotographic apparatus making use of the charging member described above is shown in FIG. 2 as a schematic structural view. Reference numeral 21 denotes a charging object member photosensitive member, which has the shape of a drum, and has a conductive support 21*b* having electrical conductivity, made of aluminum or the like, and a photosensitive layer 21*a* layered thereon. It is rotatingly driven around a shaft 21*c* in the clockwise direction as viewed on the drawing, at a stated peripheral speed.

The charging roller 1 is kept pressed against the photosensitive member with application of pressure at both end portions of the conductive support 11 by means of a press-down means (not shown), and is so disposed that the charging member, to which a direct-current (DC) bias is kept applied from a power source 22 and a rubbing-friction electrode 23*a* through the conductive support, is in contact with the photosensitive member. The charging roller is follow-up rotated as the photosensitive member is rotated, whereupon the photosensitive member is electrostatically charged to a stated polarity and potential (primary charging).

The photosensitive member thus charged is then subjected to exposure (e.g., laser beam scanning exposure, slit exposure of images of an original, or the like) of intended image information by means of an exposure unit 24, whereupon electrostatic latent images corresponding to the intended image information are formed on its peripheral surface.

The electrostatic latent images held on the photosensitive member, to which a toner is fed by means of a developing member 25, are developed into toner images. Next, a transfer material 27 is transported from a paper feed section (not shown) to a transfer zone between the photosensitive member 21 and a transfer member 26 in the manner synchronized with the rotation of the photosensitive member 21, where the transfer member, which is charged to a polarity reverse to that of the toner images from the back of the transfer material 27, is pressed against the photosensitive member, whereupon the toner images are successively transferred onto the transfer material 27.

The transfer material 27 to which the toner images have been transferred is separated from the photosensitive member 21 and then transported to a fixing means (not shown), where the toner images are fixed. The transfer material with fixed images is put out as an image-formed matter. In an electrophotographic apparatus in which images are also formed on the back, the transfer material with fixed images is again transported to the charging roller in order to form images again by a re-transporting means.

The peripheral surface of the photosensitive member from which the toner images have been transferred is subjected to pre-exposure by a pre-exposure means 28, whereby electric charges remaining on the photosensitive member are removed (destaticized). As this pre-exposure means, any known means may be used, which may preferably be exemplified by an LED chip array, a fuse lamp, a halogen lamp and a fluorescent lamp. The peripheral surface of the photosensitive member 21 thus destaticized is cleaned by means of a cleaning member 29 to remove any adherent contaminants such as transfer residual toner, and then repeatedly used for image formation.

In the electrophotographic apparatus, the charging roller 1 may be follow-up driven with or set unrotatable against the photosensitive member 21, or may be positively rotatingly driven at a stated peripheral speed in the forward direction or backward direction with respect to the direction of the surface movement of the photosensitive member 21.

Where the electrophotographic apparatus is used as a copying machine, the exposure is performed using light reflected from, or transmitted through, an original, or by the scanning of a laser beam, the driving of an LED array or the driving of a liquid crystal shutter array according to signals obtained by reading an original and converting the information into signals.

The electrophotographic photosensitive member in which the charging member of the present invention is usable may include copying machines, laser beam printers and LED printers, or apparatus where electrophotography is applied, such as electrophotographic platemaking systems.

Process Cartridge

Figure 4:
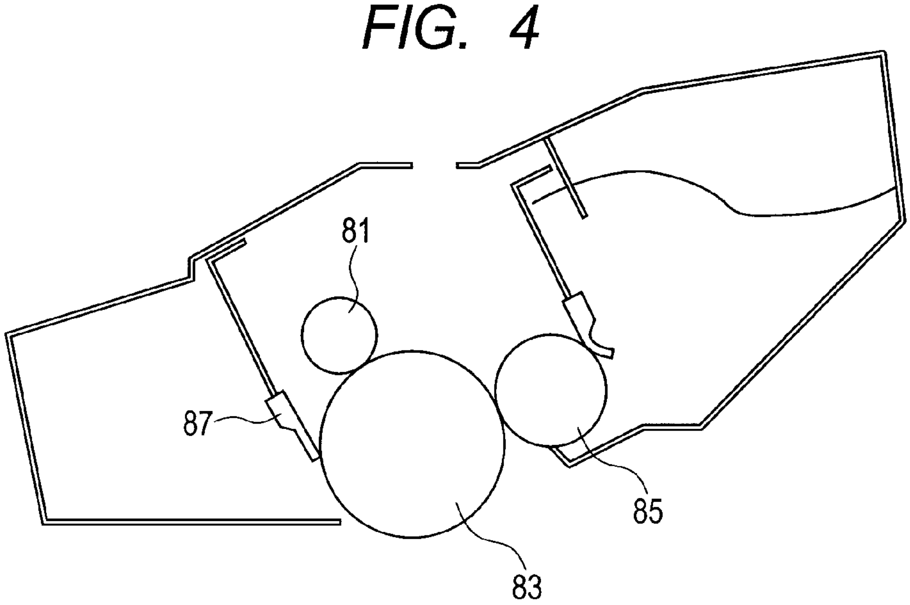
FIG. 4 is a schematic sectional view of a process cartridge according to the present invention.

FIG. 4 is a sectional view of a process cartridge according to an embodiment of the present invention, having a charging roller 81 according to the present invention and being so set up as to be detachably mountable to the main body of the electrophotographic apparatus. In the process cartridge shown in FIG. 4, an electrophotographic photosensitive drum 83 is so disposed as to be chargeable by a charging roller 81. Reference numeral 85 denotes a developing roller with which a developer for developing electrostatic latent images formed on the surface of the electrophotographic photosensitive drum 83 is fed-thereto. Further, reference numeral 87 denotes a cleaning blade with which any developer remaining on the peripheral surface of the electrophotographic photosensitive drum 83 is removed.

EXAMPLES

The present invention is described below in greater detail by giving specific working examples. In the following, "part(s)" refers to "part(s) by mass" unless particularly noted.

Synthesis Example 1

Synthesis of terminal-modified copolymer rubber 1: Into an autoclave having an inner volume of 15 liters the internal atmosphere of which was displaced with nitrogen, materials shown in Table 1 below were fed.

TABLE 1

| | |
|---|---|
| Cyclohexane | 8,250 g |
| Tetrahydrofuran | 123.9 g |
| Styrene | 375 g |
| 1,3-Butadiene | 1,095 g |
| Potassium dodecylbenzenesulfonate | 294 mg |

After the temperature of the contents in the autoclave was controlled to 20° C., 645 mg of n-butyllithium was added thereto to initiate polymerization. At a point in time where the polymerization conversion reached 99%, 30 g of 1,3-butadiene was added to carry out the polymerization further for 5 minutes. Thereafter, 6.6 g of hexyl(propylthio)propionate was added as a terminal-modifying agent to carry out reaction for 15 minutes.

To the liquid reaction mixture obtained, 2,6-di-tert-butyl-p-cresol was added, and the terminal-modified copolymer rubber thus formed was allowed to coagulate. Thereafter, this was dried under reduced pressure at a temperature of 60° C. for 24 hours to isolate a terminal-modified styrene-butadiene copolymer (terminal-modified copolymer rubber 1).

Synthesis Examples 2 to 24 & 26

Synthesis of terminal-modified copolymer rubbers 2 to 24 & 26:

Terminal-modified copolymer rubbers 2 to 24 and 26 were prepared in the same way as Synthesis Example 1 except that the terminal-modifying agent in Synthesis Example 1 was changed for terminal-modifying agents shown in Table 2 below.

TABLE 2

| Synthesis Example No. | Terminal-modifying agent |
|---|---|
| 2 | Stearyl (methylthio)propionate |
| 3 | Methyl (stearylthio)propionate |
| 4 | Stearyl (stearylthio)propionate |
| 5 | Stearyl (laurylthio)heptanoate |
| 6 | Methyl (laurylthio)acetate |
| 7 | Myristyl (octylthio)propionate |
| 8 | Methyl (methylthio)propionate |
| 9 | Stearyl (benzylthio)propionate |
| 10 | Stearyl (β-2,5-xylylthio)propionate |
| 11 | Phenyl (methylthio)propionate |
| 12 | Benzyl (methylthio)propionate |
| 13 | Phenyl (stearylthio)propionate |
| 14 | Benzyl (stearylthio)propionate |
| 15 | Phenyl (octylthio)heptanoate |
| 16 | Benzyl (laurylthio)propionate |
| 17 | Phenyl (benzylthio)propionate |
| 18 | Dimethyl 3,3-thiodipropionate |
| 19 | Dimyristyl 3,3-thiodipropionate |
| 20 | Distearyl 3,3-thiodipropionate |
| 21 | Dimethyl 7,7-thiodiheptanoate |
| 22 | Distearyl 7,7-thiodiheptanoate |
| 23 | Diethyl 4,4-thiodibutanoate |
| 24 | Diphenyl 4,4-thiodipropionate |
| 26 | Dibenzyl 4,4-thiodiheptanoate |

Synthesis Example 25

Synthesis of terminal-modified copolymer rubber 25:

Into an autoclave having an inner volume of 15 liters the internal atmosphere of which was displaced with nitrogen, materials shown in Table 3 below were fed.

TABLE 3

| | |
|---|---|
| Cyclohexane | 8,250 g |
| Tetrahydrofuran | 123.9 g |
| Styrene | 375 g |
| 1,3-Butadiene | 990 g |
| Isoprene | 90 g |
| Potassium dodecylbenzenesulfonate | 294 mg |

After the temperature of the contents in the autoclave was controlled to 20° C., 645 mg of n-butyllithium was added thereto to initiate polymerization. At a point in time where the polymerization conversion reached 99%, 30 g of isoprene was added to carry out the polymerization further for 5 minutes. Thereafter, 6.6 g of dimyristyl thiodipropionate was added as a terminal-modifying agent to carry out reaction for 15 minutes.

To the liquid reaction mixture obtained, 2,6-di-tert-butyl-p-cresol was added, and the terminal-modified copolymer rubber thus formed was allowed to coaguluate. Thereafter, this, was dried under reduced pressure at a temperature of 60° C. for 24 hours to isolate a terminal-modified styrene-butadiene copolymer (terminal-modified copolymer rubber 25).

Characteristic features of the above terminal-modified copolymer rubbers 1 to 25 are shown in Tables 4 and 5 below.

TABLE 4

| | Structural formula of terminal group | | | | | | |
|---|---|---|---|---|---|---|---|
| | | $R_1$ | | $R_2$ | | $X_1$ | |
| No. | No. | Carbon atom(s) | Group | Carbon atom(s) | Group | Carbon atom(s) | Group |
| 1 | (1) | 3 | Alkyl | 2 | Alkylene | 6 | Alkoxyl |
| 2 | (1) | 1 | Alkyl | 2 | Alkylene | 18 | Alkoxyl |
| 3 | (1) | 18 | Alkyl | 2 | Alkylene | 1 | Alkoxyl |
| 4 | (1) | 18 | Alkyl | 2 | Alkylene | 18 | Alkoxyl |
| 5 | (1) | 14 | Alkyl | 6 | Alkylene | 18 | Alkoxyl |
| 6 | (1) | 14 | Alkyl | 1 | Alkylene | 1 | Alkoxyl |
| 7 | (1) | 8 | Alkyl | 2 | Alkylene | 14 | Alkoxyl |
| 8 | (1) | 1 | Alkyl | 2 | Alkylene | 1 | Alkoxyl |
| 9 | (1) | 7 | Aryl | 2 | Alkylene | 18 | Alkoxyl |
| 10 | (1) | 9 | Aryl | 2 | Alkylene | 18 | Alkoxyl |
| 11 | (1) | 1 | Alkyl | 2 | Alkylene | 6 | Aryl |
| 12 | (1) | 1 | Alkyl | 2 | Alkylene | 7 | Aryl |
| 13 | (1) | 18 | Alkyl | 2 | Alkylene | 6 | Aryl |
| 14 | (1) | 18 | Alkyl | 2 | Alkylene | 7 | Aryl |
| 15 | (1) | 8 | Alkyl | 6 | Alkylene | 6 | Aryl |
| 16 | (1) | 12 | Alkyl | 2 | Alkylene | 7 | Aryl |
| 17 | (1) | 7 | Aryl | 2 | Alkylene | 6 | Aryl |

TABLE 5

| | Structural formula of terminal group | | | | |
|---|---|---|---|---|---|
| | | $R_3$'s | | $X_2$'s | |
| No. | No. | Carbon atom(s) | Group | Carbon atom(s) | Group |
| 18 | (2) | 2 | Alkylene | 1 | Alkoxyl |
| 19 | (2) | 2 | Alkylene | 14 | Alkoxyl |
| 20 | (2) | 2 | Alkylene | 18 | Alkoxyl |
| 21 | (2) | 6 | Alkylene | 1 | Alkoxyl |
| 22 | (2) | 6 | Alkylene | 18 | Alkoxyl |
| 23 | (2) | 3 | Alkylene | 2 | Alkoxyl |
| 24 | (2) | 2 | Alkylene | 6 | Aryl |
| 25 | (2) | 2 | Alkylene | 14 | Alkoxyl |
| 26 | (2) | 6 | Alkylene | 7 | Aryl |

Synthesis Example 27

Synthesis of terminal-unmodified copolymer rubber 1:

A terminal-unmodified copolymer rubber 1 was obtained in the same way as Synthesis Example 1 except that the terminal-modifying agent was not used.

Synthesis Example 28

Synthesis of terminal-unmodified copolymer rubber 2:

Into an autoclave having an inner volume of 15 liters the internal atmosphere of which was displaced with nitrogen, materials shown in Table 6 below were fed.

TABLE 6

| | |
|---|---|
| Cyclohexane | 8,250 g |
| Tetrahydrofuran | 123.9 g |
| 1,3-Butadiene | 1,370 g |

After the temperature of the contents in the autoclave was controlled to 20° C., 645 mg of n-butyllithium was added thereto to initiate polymerization. At a point in time where the polymerization conversion reached 99%, 30 g of 1,3-butadiene was added to carry out the reaction for 20 minutes.

To the liquid reaction mixture obtained, 2,6-di-tert-butyl-p-cresol was added, and then the polymer thus formed was allowed to coaguluate. Thereafter, this was dried under reduced pressure at 60° C. for 24 hours to obtain a copolymer rubber having a butadiene skeleton (terminal-unmodified copolymer rubber 2).

Example 1

Preparation of rubber mixture:

Materials shown in Table 7 below were mixed by means of a 6-liter pressure kneader (TD6-15MDX; manufactured by Toshin Co., Ltd.) for 16 minutes in a packing of 70 vol.% and at a number of blade revolutions of 30 rpm to obtain a first-stage kneaded rubber composition.

TABLE 7

| | |
|---|---|
| Terminal-modified copolymer rubber 1 | 100 parts |
| Zinc stearate | 1 part |
| Zinc oxide | 5 parts |
| Calcium carbonate (trade name: NANOX #30; available from Maruo Calcium Co., Ltd.) | 30 parts |
| Carbon black (trade name: TOKA BLACK #7400; available from Tokai Carbon Co., Ltd.; pH: 7.0) | 50 parts |

Next, materials shown in Table 8 below were mixed for 20 minutes by means of an open roll of 12 inches in roll diameter at a number of front-roll revolutions of 8 rpm and a number of back-roll revolutions of 10 rpm and at a roll gap of 2 mm, to obtain an unvulcanized rubber mixture for elastic layer.

TABLE 8

| | |
|---|---|
| First-stage kneaded rubber composition | 186 parts |
| Sulfur (cross-linking agent) | 1.2 parts |
| Tetrabenzylthiuram disulfide (trade name: NOCCELLER TBzTD; available from Ohuchi-Shinko Chemical Industrial Co., Ltd.) | 1.0 part |
| N-t-butyl-2-benzothiazole sulfenimide (trade name: SUNTOCURE-TBSI; available from FLEXSYS) | 1.0 part |

Forming for elastic layer:

The unvulcanized rubber composition obtained was extruded in the shape of a tube by means of a vented rubber extruder (a vented extruder of 45 mm in diameter; L/D: 20; manufactured by Nakata Engineering Co., Ltd.), and this extruded product was subjected to primary vulcanization at 160° C. for 30 minutes under power steam by means of a vulcanizing pan. Thus, a rubber tube of 10 mm in outer diameter, 5.5 mm in inner diameter and 250 mm in length was obtained.

Next, a columnar conductive mandrel (made of steel and plated with nickel on its surface) of 6 mm in diameter and 252 mm in length was coated with a conductive hot melt adhesive over the column surface on its middle portion of 232 mm in axial direction, followed by drying at 80° C. for 30 minutes. This mandrel coated with the adhesive was press-fitted into the above rubber tube, and then this rubber tube was subjected to secondary vulcanization and bond treatment at 160° C. for 30 hours in a hot-air oven. The composite body obtained was cut off at its both end portions to produce an unsanded roller of 232 mm in length at its rubber portion.

This unsanded roller was sanded at its rubber portion by means of a sander (trade name: LEO-600-F4-BME, manufactured by Minakuchi Machinery Works Ltd.) to obtain a rubber roller having an elastic layer, having a crown shape of 8.35 mm in end-portion diameter and 8.50 mm in middle-portion diameter.

The rubber roller obtained was irradiated with ultraviolet rays on its surface to carry out surface modification treatment. This surface treatment was carried out by irradiating the surface with ultraviolet rays of 254 nm in wavelength in such a way that the integrated amount of light came to 8,500 $mJ/cm^2$. Here, a low-pressure mercury lamp manufactured by Harison Toshiba Lighting Corporation was used in the irradiation with ultraviolet rays.

Thus, a charging roller 1 was produced. About the charging roller obtained, its hardness, electrical resistance and electrification deterioration were measured, and evaluation was made on images. The results are shown in Tables 11-1 and 11-2.

Evaluation 1: Hardness

The hardness of the charging roller 1 was measured. It was measured with a microhardness meter MD-1 Model (manufactured by Koubunshi Keiki Co., Ltd.) and in a peak hold mode in an environment of 23° C. and 55% RH. Stated more specifically, the charging roller was placed on a plate made of a metal, and a block made of a metal was placed to simply fasten the charging member so as not to roll over, where a measuring terminal was pressed against the metal plate accurately at the center of the charging member in the vertical direction, where a value after 5 seconds was read. This was measured at both end portions positioned 30 to 40 mm away from rubber ends of the charging roller and the middle portion thereof, and at 3 spots each in the peripheral direction, i.e., at 9 spots in total. An average value of the measured values obtained was taken as the hardness of the elastic layer.

Evaluation 2: Electrical Resistance

Figure 3:
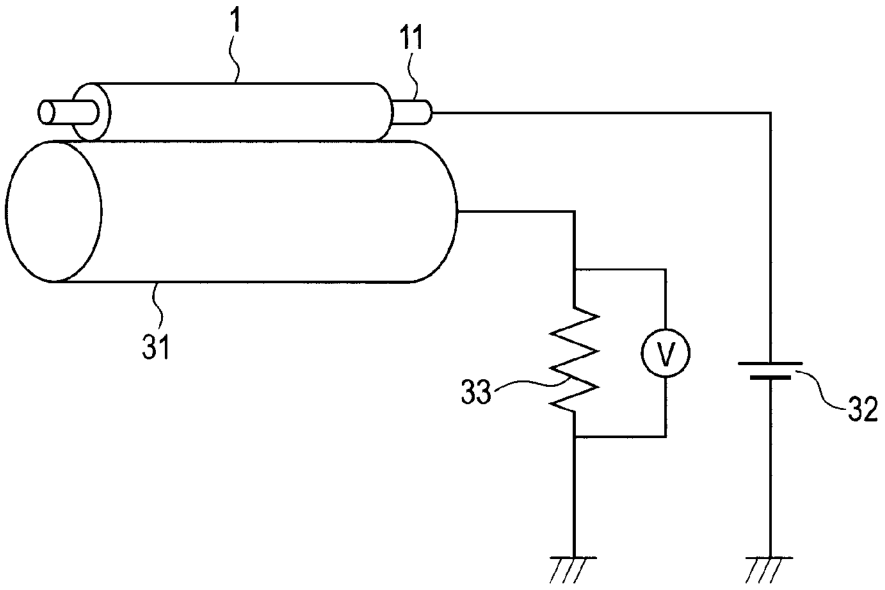
FIG. 3 is a structural view showing an example of an electrical resistance measuring equipment with which the electrical resistance of the charging member of the present invention is measured.

The electrical resistance of the charging roller was measured with an electrical resistance measuring instrument schematically shown in FIG. 3. The charging roller 1 was kept pressed against a cylindrical aluminum drum 31 with application of pressure at both end portions of a conductive support 11 by means of a press-down means (not shown), and was follow-up rotated as the aluminum drum 31 was rotatingly driven. In this state, a DC voltage was applied to the conductive support 11 of the charging roller 1 by the use of an external power source 32, where the voltage applied to a standard resistance 33 connected to the aluminum drum in series was measured. The electrical resistance of the charging roller was calculated by finding the value of electric current flowing through the circuit, from the voltage of the standard resistance 33, thus measured.

The electrical resistance of the charging roller 1 was measured under application of a DC voltage of 200 V across the conductive support and the aluminum drum for 2 seconds in an environment of temperature 23° C. and humidity 50% RH (hereinafter also noted as “NN environment”). In this measurement, the number of revolutions of the aluminum drum was 30 rpm, and the value of resistance of the standard resistance was 100 ohms. Data were sampled at a frequency of 20 Hz at intervals of 1 second after 1 second lapsed after the voltage was applied, and an average value of the electrical resistance values obtained was taken as the resistance value. Also, on the basis of the ratio of the maximum electrical resistance to the minimum electrical resistance thus measured, the electrical resistance non-uniformity in peripheral direction of the charging roller 1 was measured.

The above measurement of electrical resistance was also made in an environment of temperature 15° C. and humidity 10% RH (hereinafter also noted as “LL environment”) and in an environment of 30° C. and 80% RH (hereinafter also noted as "HH environment"). Then, the ratio of the electrical resistance value in the LL environment to that in the HH environment, LL/HH, was taken as a parameter indicating the degree of environmental variations of the electrical resistance.

Evaluation 3: Electrification Test

An electrification test was conducted using the electrical resistance measuring instrument shown in FIG. 3. In the same way as the above measurement of electrical resistance, a DC voltage of 200 V was applied across the support and the aluminum drum for 2 seconds in the NN environment to measure the value of electrical resistance at the initial stage. In this measurement, the number of revolutions of the aluminum drum was 30 rpm, and the value of resistance of the standard resistance was 100 ohms.

Next, while the aluminum drum was rotated at 30 rpm, a DC voltage of 200 V was applied across the support and the aluminum drum for 10 minutes. Thereafter, the value of electrical resistance of the charging roller was again measured. Then, the value of electrical resistance at the initial stage was divided by the value of electrical resistance after the electrification test, and the value found was multiplied by 100 to thereby calculate retention rate of electrical resistance (%).

Evaluation 4: Image Evaluation

The charging roller produced was set as a charging roller of an electrophotographic process cartridge, and this process cartridge was set in an electrophotographic apparatus (trade name: LBP 5050; manufactured by CANON INC.) capable of A4-size sheet lengthwise image reproduction.

This laser beam printer was used to form electrophotographic images. More specifically, an electrophotographic image composed of halftone images formed on A4-size paper (images of lines of one-dot width which were drawn at two-dot intervals in the direction perpendicular to the rotational direction of the electrophotographic photosensitive member) was reproduced on one sheet. This image is called a first-sheet image.

Next, images composed of 4-point size letters of alphabet "E" which were so formed on A4-size paper as to be 1% in print percentage were formed on 2,500 sheets. Subsequently, the electrophotographic image composed of halftone images formed on A4-size paper was reproduced on one sheet. This image is called a 2,501st-sheet image. Here, all the electrophotographic images were reproduced in an environment of temperature 15° C. and relative humidity 10% RH.

The first-sheet image and 2,501st-sheet image thus formed were visually observed on whether or not, and how far, any fine horizontal lines were seen which were likely to occur when the charging roller came to have a high value of electrical resistance, to make evaluation according to criteria shown in Table 9. Also, about the 2,501st-sheet image, it was visually observed on whether or not, and how far, any fine vertical lines were seen which were likely to occur when the surface of the charging roller came stained with toner and so forth, to make evaluation also according to the criteria shown in Table 9.

TABLE 9

| Ranking | Criteria |
|---|---|
| A | Any lines are not seen to have occurred. |
| B | Lines are slightly seen to have occurred. |
| C | Lines are seen to have occurred. |
| D | Lines are conspicuously seen to have occurred. |

Examples 2 & 3

Charging rollers 2 and 3 were produced in the same way as Example 1 except that the "carbon black" shown in Table 7 in Example 1 was added in an amount changed to 30 parts by mass or 70 parts by mass, respectively. These were evaluated in the same way as Example 1.

Examples 4 to 23

Charging rollers 4 to 23 were produced in the same way as Example 1 except that, of the materials shown in Table 7 in Example 1, the carbon black was added in an amount changed to 45 parts by mass and also that the terminal-modified copolymer rubber 1 was changed for the terminal-modified copolymer rubbers 2 to 21, respectively. These were evaluated in the same way as Example 1.

Examples 24 to 27

Charging rollers 24 to 27 were produced in the same way as Example 1 except that, of the materials shown in Table 7 in Example 1, the carbon black was changed for RAVEN 1255 (trade name; available from Columbian Chemicals Company; pH value: 2.5) and was added in an amount changed to 40 parts by mass and also that the terminal-modified copolymer rubber 1 was changed for the terminal-modified copolymer rubbers 22 to 25, respectively. These were evaluated in the same way as Example 1.

Examples 28 to 31

Charging rollers 28 to 31 were produced in the same way as Example 1 except that, of the materials shown in Table 7 in Example 1, the type and amount of the carbon black and terminal-modified copolymer rubber 1 added were changed as shown in Table 10 below. These were evaluated in the same way as Example 1.

TABLE 10

| Example | Terminal = modified copolymer rubber No. | Carbon black Type | Carbon black Amount (pbm) |
|---|---|---|---|
| 28 | 19 | PRINTEX 300 (trade name; available from Degussa Corp.; pH value: 9.5) | 40 |
| 29 | 19 | TOKA BLACK #7400 (trade name; available from Tokai Carbon Co., Ltd.; pH value: 7.0) | 25 |
| 30 | 19 | TOKA BLACK #7400 (trade name; available from Tokai Carbon Co., Ltd.; pH value: 7.0) | 75 |
| 31 | 26 | TOKA BLACK #7400 (trade name; available from Tokai Carbon Co., Ltd.; pH value: 7.0) | 45 |

Comparative Examples 1 & 2

Charging rollers 32 and 33 were produced in the same way as Example 1 except that, of the materials shown in Table 7 in Example 1, the terminal-modified copolymer rubber 1 was changed for the terminal-unmodified copolymer rubbers 1 and 2, respectively. These were evaluated in the same way as Example 1.

The results of evaluation of the charging rollers according to Examples 1 to 31 and Comparative Examples 1 and 2 are shown in Tables 11-1 and 11-2.

TABLE 11-1

| | Evaluation | | | | | | | | |
|---|---|---|---|---|---|---|---|---|---|
| | (1) | (2) Electrical resistance | | | (3) Electrical resistance | | (4) | | |
| | | | | | | | Horizontal lines | | vertical lines |
| Example: | MD-1 hardness (°) | Value in NN environment (Ω) | Non-uniformity in peripheral direction | LL/HH ratio | Value after electrification test (Ω) | Retention rate of electrical resistance (%) | First-sheet image | 2,510st = sheet image | 2,510st = sheet image |
| 1 | 72 | 69,000 | 1.5 | 1.2 | 92,000 | 75 | A | A | A |
| 2 | 60 | 360,000 | 1.7 | 1.1 | 570,000 | 63 | A | A | A |
| 3 | 83 | 12,000 | 1.8 | 1.1 | 18,000 | 67 | A | A | A |
| 4 | 68 | 55,000 | 1.6 | 1.2 | 79,000 | 70 | A | A | A |
| 5 | 69 | 49,000 | 1.6 | 1.1 | 68,000 | 72 | A | A | A |
| 6 | 68 | 29,000 | 1.7 | 1.2 | 43,000 | 67 | A | A | A |
| 7 | 68 | 34,000 | 1.5 | 1.1 | 52,000 | 65 | A | A | A |
| 8 | 68 | 44,000 | 1.6 | 1.1 | 64,000 | 69 | A | A | A |
| 9 | 67 | 64,000 | 1.4 | 1.2 | 86,000 | 74 | A | A | A |
| 10 | 68 | 39,000 | 1.4 | 1.1 | 65,000 | 60 | A | B | A |
| 11 | 68 | 13,000 | 1.5 | 1.2 | 20,000 | 65 | A | B | A |
| 12 | 68 | 19,000 | 1.9 | 1.1 | 26,000 | 73 | A | B | A |
| 13 | 68 | 24,000 | 1.8 | 1.1 | 32,000 | 75 | A | A | A |
| 14 | 68 | 38,000 | 1.7 | 1.2 | 59,000 | 64 | A | B | A |
| 15 | 68 | 67,000 | 1.7 | 1.2 | 95,000 | 71 | A | B | A |
| 16 | 69 | 34,000 | 1.8 | 1.1 | 54,000 | 63 | A | B | A |

TABLE 11-2

| | Evaluation | | | | | | | | |
|---|---|---|---|---|---|---|---|---|---|
| | (1) | (2) Electrical resistance | | | (3) Electrical resistance | | (4) | | |
| | | | | | | | Horizontal lines | | vertical lines |
| | MD-1 hardness (°) | Value in NN environment (Ω) | Non-uniformity in peripheral direction | LL/HH ratio | Value after electrification test (Ω) | Retention rate of electrical resistance (%) | First-sheet image | 2,510st = sheet image | 2,510st = sheet image |
| Example: | | | | | | | | | |
| 17 | 68 | 42,000 | 1.7 | 1.2 | 66,000 | 64 | A | B | A |
| 18 | 68 | 44,000 | 1.6 | 1.2 | 68,000 | 65 | A | B | A |
| 19 | 68 | 39,000 | 1.2 | 1.2 | 62,000 | 63 | A | B | A |
| 20 | 68 | 37,000 | 1.1 | 1.2 | 58,000 | 64 | A | B | A |
| 21 | 68 | 25,000 | 1.3 | 1.1 | 36,000 | 69 | A | B | A |
| 22 | 69 | 67,000 | 1.4 | 1.2 | 100,000 | 67 | A | B | A |
| 23 | 68 | 71,000 | 1.2 | 1.2 | 106,000 | 67 | A | B | A |
| 24 | 64 | 190,000 | 1.2 | 1.1 | 290,000 | 66 | A | B | A |
| 25 | 64 | 170,000 | 1.3 | 1.2 | 250,000 | 68 | A | B | A |
| 26 | 66 | 190,000 | 1.3 | 1.1 | 280,000 | 68 | A | B | A |
| 27 | 65 | 210,000 | 1.3 | 1.2 | 320,000 | 66 | A | B | A |
| 28 | 65 | 260,000 | 1.4 | 1.1 | 390,000 | 67 | A | B | A |
| 29 | 56 | 850,000 | 1.4 | 1.1 | 1,300,000 | 65 | A | B | B |
| 30 | 85 | 10,000 | 1.5 | 1.1 | 13,000 | 77 | A | B | B |
| 31 | 69 | 68,000 | 1.3 | 1.1 | 99,000 | 69 | A | B | A |
| Comparative Example: | | | | | | | | | |
| 1 | 73 | 86,000 | 2.4 | 1.2 | 250,000 | 34 | A | D | B |
| 2 | 68 | 54,000 | 2.5 | 1.3 | 200,000 | 27 | A | D | B |

EAs shown in Tables 11-1 and 11-2 above, the charging rollers according to Examples 1 to 31 had retention rate of electrical resistance after electrification, of about 1.9 or more times than that of the charging roller according to Comparative Example 1 and about 2.3 or more times than that of the charging roller according to Comparative Example 2. From this fact as well, the charging roller according to the present invention is seen not to be easily change in electrical resistance even if the DC voltage is applied thereto over a long period of time.

Reference Signs List

1 charging roller (charging member)

11 conductive support

12 elastic layer

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-232818, filed on Oct. 15, 2010, which is herein incorporated by, reference as part of this application.

What is claimed is:

1. A charging member comprising:

an electrically conductive support; and an electrically conductive elastic layer; wherein:

the elastic layer comprises a vulcanized rubber, and the vulcanized rubber is a vulcanized product of a mixture which comprises i) a binder polymer containing a polymer having a butadiene skeleton; and ii) carbon black, and wherein:

the polymer having a butadiene skeleton stands modified at the molecular terminal(s) thereof with at least one of the groups represented by the following formulas (1) and (2):

(1)

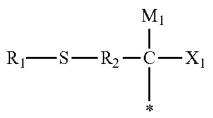

wherein $R_1$ represents an alkyl group having 1 to 18 carbon atom(s) or a phenyl group which may be substituted with an alkyl group having 1 to 3 carbon atom(s);

$R_2$ represents an alkylene group having 1 to 6 carbon atom(s); $M_1$ represents a hydroxyl group; $X_1$ represents an alkyl group having 1 to 18 carbon atom(s), a phenyl group which may be substituted with an alkyl group having 1 to 3 carbon atom(s), or an alkoxyl group having 1 to 18 carbon atom(s); and an asterisk * represents the position of bonding with a carbon atom at the terminal end of the polymer having a butadiene skeleton;

(2)

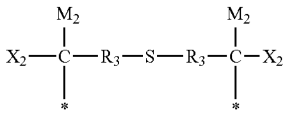

wherein $R_3$'s each represent an alkylene group having 1 to 6 carbon atom(s);

$M_2$'s each represent a hydroxyl group; $X_2$'s each represent an alkyl group having 1 to 18 carbon atom(s), a phenyl group which may be substituted with an alkyl group having 1 to 3 carbon atom(s), or an alkoxyl group having 1 to 18 carbon atom(s); and asterisks *'s represent the position of bonding with carbon atoms at the terminal end of the polymer having a butadiene skeleton.

2. The charging roller according to claim 1, wherein the rubber is a styrene-butadiene rubber.

3. The charging roller according to claim 1, wherein the carbon black is contained in an amount of from 30 parts by mass to 70 parts by mass based on 100 parts by mass of the rubber.

4. An electrophotographic apparatus comprising:

the charging member according to claim 1, and an electrophotographic photosensitive member which is so disposed as to be electrostatically chargeable by the charging member.

5. A process cartridge comprising the charging member according to claim 1, the process cartridge being so conformed as to be detachably mountable to the main body of an electrophotographic apparatus.

* * * * *